US012682563B2

(12) United States Patent
Aizawa et al.

(10) Patent No.: US 12,682,563 B2
(45) Date of Patent: Jul. 14, 2026

(54) INFORMATION PROCESSING APPARATUS, INFORMATION PROCESSING METHOD, AND NON-TRANSITORY COMPUTER-READABLE MEDIUM FOR GENERATING METADATA ON A 3D MODEL OF AN OBJECT

(71) Applicant: CANON KABUSHIKI KAISHA, Tokyo (JP)

(72) Inventors: Michio Aizawa, Kanagawa (JP); Keisuke Morisawa, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 155 days.

(21) Appl. No.: 18/619,275

(22) Filed: Mar. 28, 2024

(65) Prior Publication Data

US 2024/0338892 A1 Oct. 10, 2024

(30) Foreign Application Priority Data

Apr. 5, 2023 (JP) ................................. 2023-061548

(51) Int. Cl.
| | |
|---|---|
| *G06T 17/00* | (2006.01) |
| *G06T 7/20* | (2017.01) |
| *G06T 7/50* | (2017.01) |
| *G06T 7/70* | (2017.01) |
| *G06V 10/764* | (2022.01) |
| *H04N 13/279* | (2018.01) |

(52) U.S. Cl.
CPC ................ *G06T 17/00* (2013.01); *G06T 7/20* (2013.01); *G06T 7/50* (2017.01); *G06T 7/70* (2017.01); *G06V 10/764* (2022.01); *H04N 13/279* (2018.05)

(58) Field of Classification Search
CPC .. G06T 17/00; G06T 7/20; G06T 7/50; G06T 7/70; G06T 19/00; G06V 10/764; H04N 13/279
See application file for complete search history.

(56) References Cited

U.S. PATENT DOCUMENTS

| | | | |
|---|---|---|---|
| 11,574,432 B2 | 2/2023 | Morisawa | |
| 2014/0047377 A1* | 2/2014 | Nos ........................ | G06F 16/252 |
| | | | 715/781 |
| 2018/0046649 A1* | 2/2018 | Dal Mutto ........... | G06N 3/0464 |
| 2018/0270427 A1* | 9/2018 | Damstra .......... | H04N 21/21805 |
| 2024/0296590 A1* | 9/2024 | Aksoy ..................... | G06T 9/001 |

FOREIGN PATENT DOCUMENTS

| | | | | |
|---|---|---|---|---|
| GB | 2551239 A | * | 12/2017 | ............... G06T 7/20 |
| JP | 2015-045920 A | | 3/2015 | |

* cited by examiner

*Primary Examiner* — Maurice L. Mcdowell, Jr.

(74) *Attorney, Agent, or Firm* — Carter, DeLuca & Farrell LLP

(57) ABSTRACT

An information processing apparatus is provided. The apparatus obtains information on a 3D model of an object. The apparatus generates metadata on the 3D model of the object on a basis of the information in accordance with a metadata generation request including a metadata type designation. The apparatus transmits the metadata on the 3D model of the object generated in accordance with the generation request.

20 Claims, 14 Drawing Sheets

F I G. 2

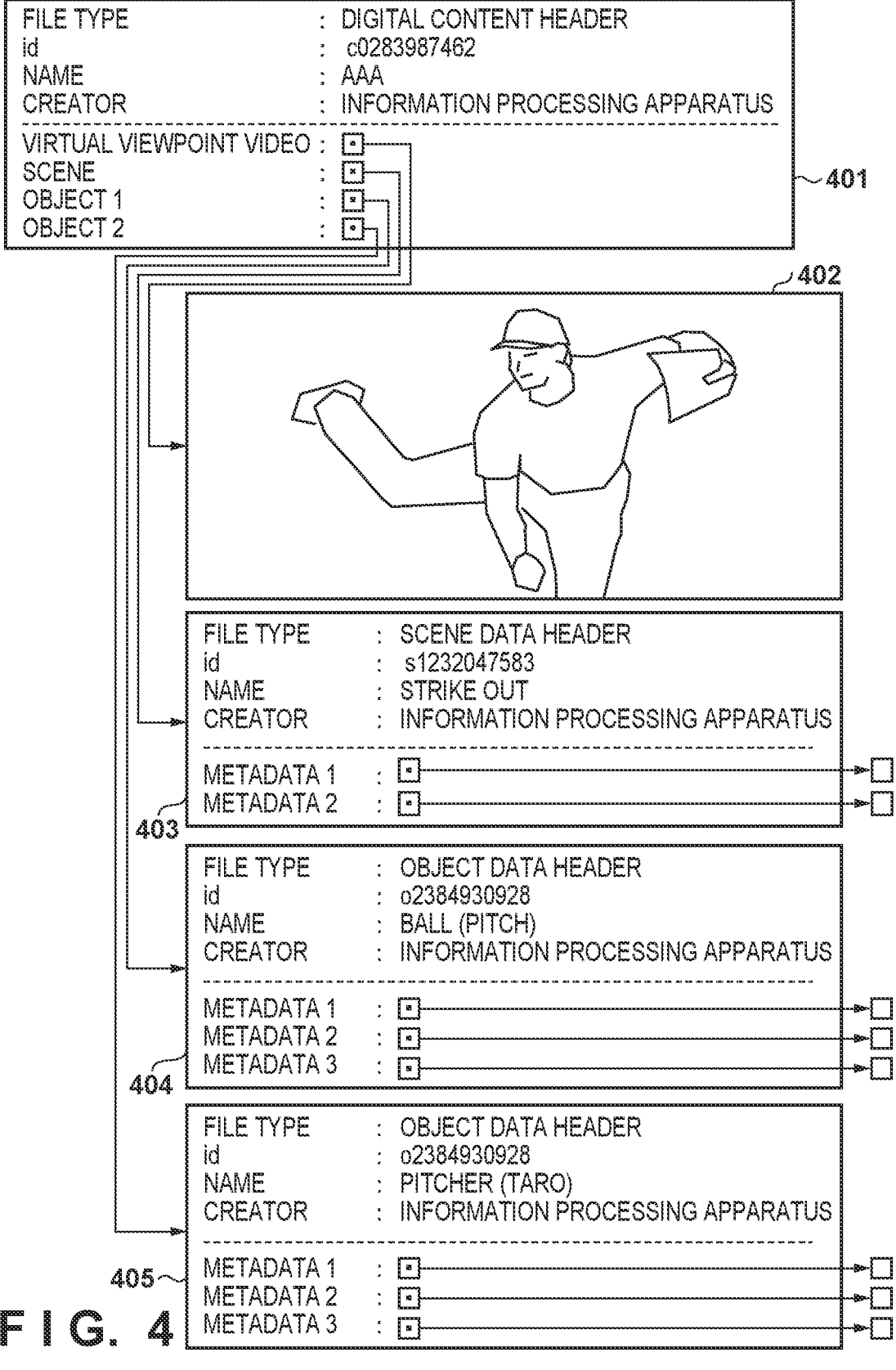
F I G. 4

F I G. 7
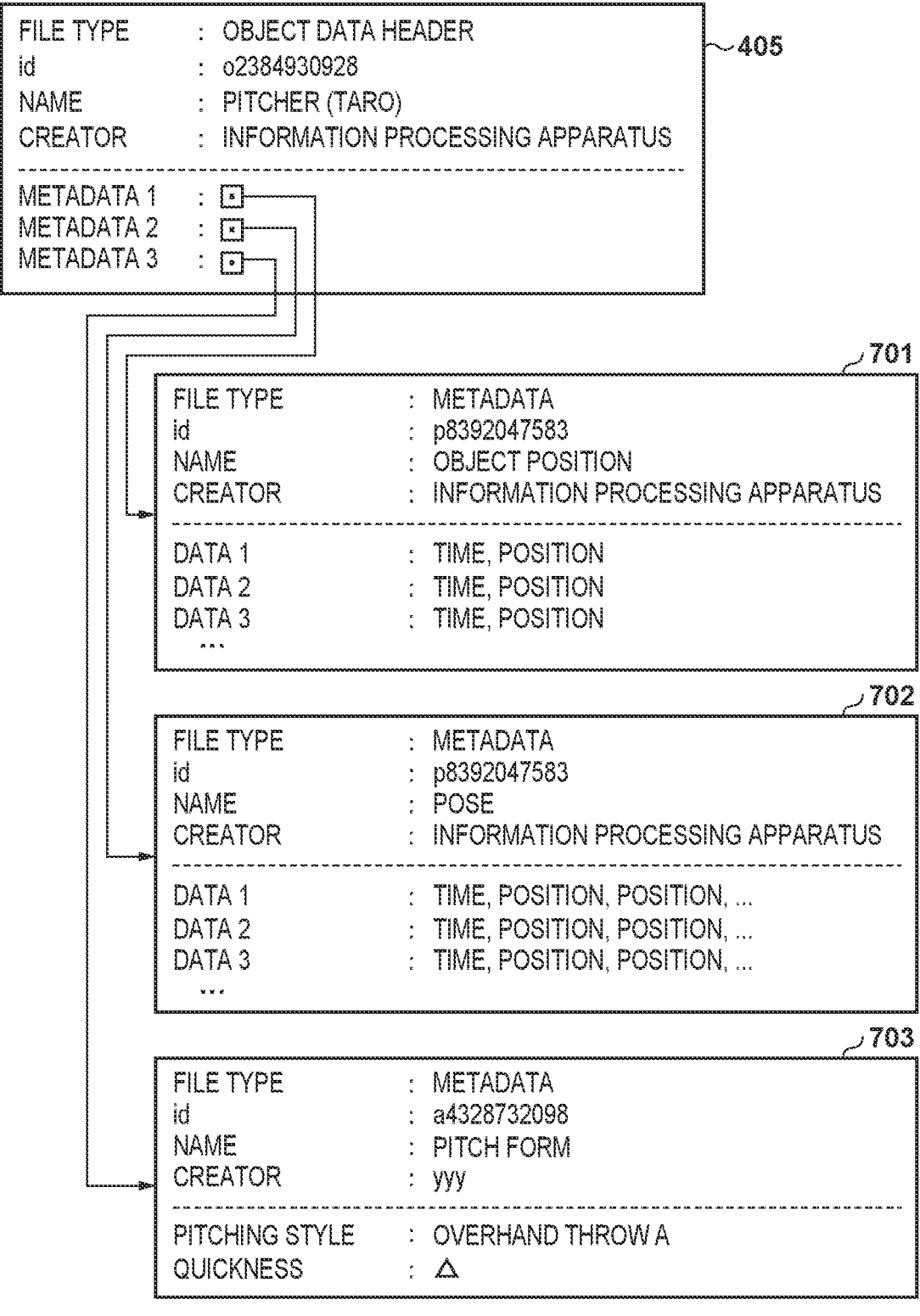

F I G .  8

| CREATOR | yyy |
|---|---|
| NAME | PITCH |
| DIGITAL CONTENT OF TARGET | c0283987462 |
| EXISTING METADATA | o2384930928 |
| PARAMETER 1 | PITCH TYPE: STRAIGHT \| CURVE \| FORK |
| PARAMETER 2 | PITCH SPEED:80.0 – 170.0 |
| PARAMETER 3 | SHARPNESS: GOOD \| NORMAL \| BAD |

F I G. 9
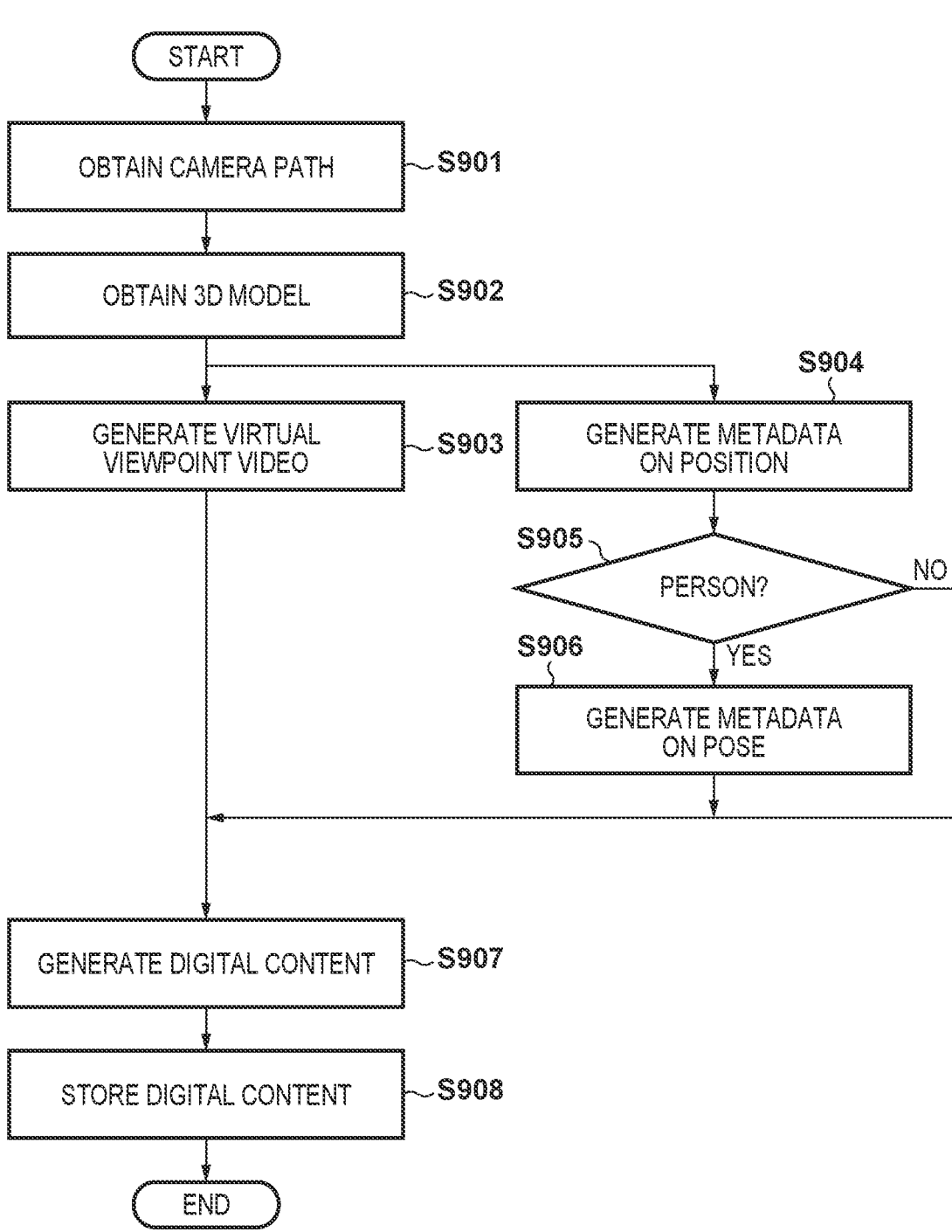

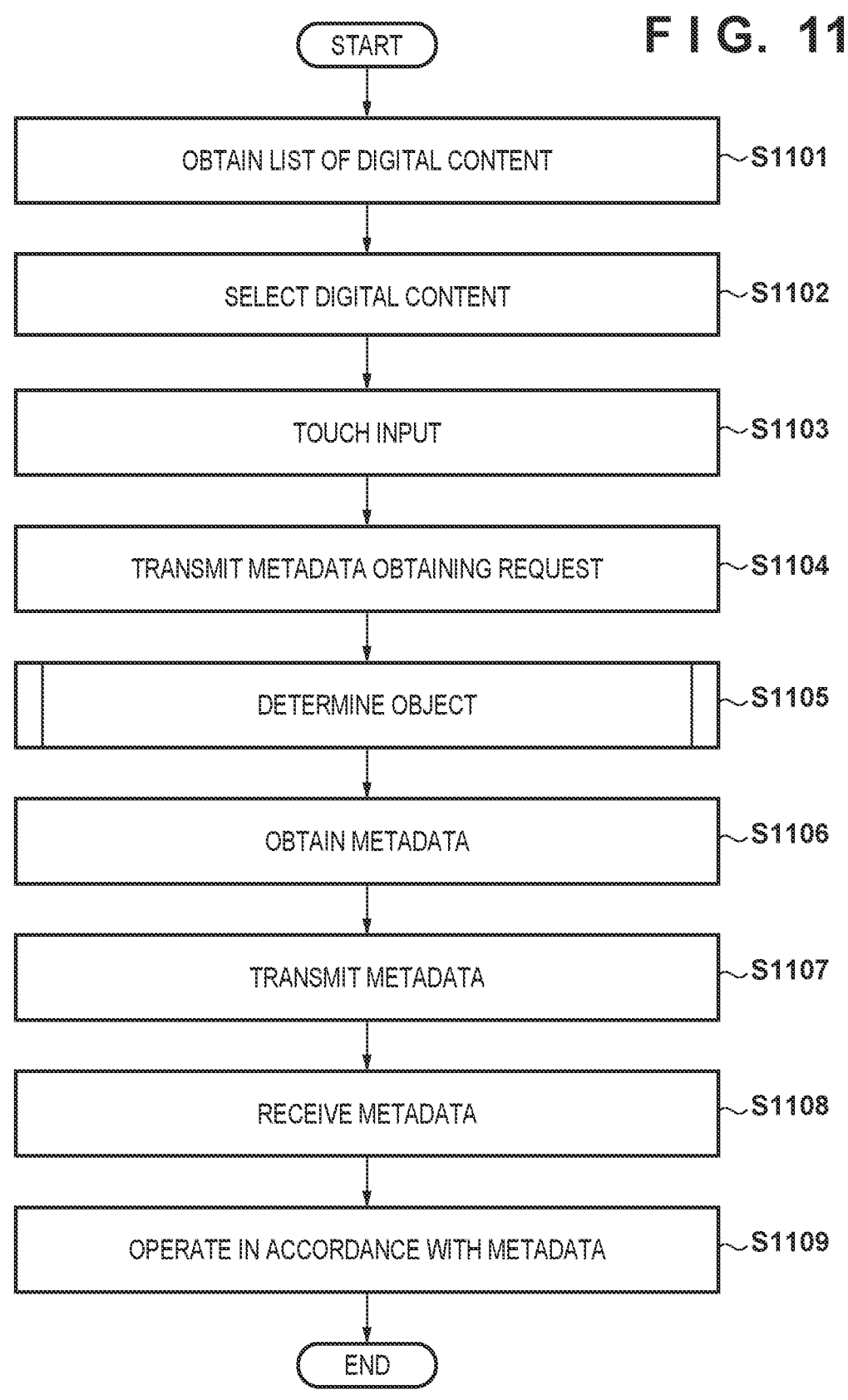
F I G. 11

F I G. 12

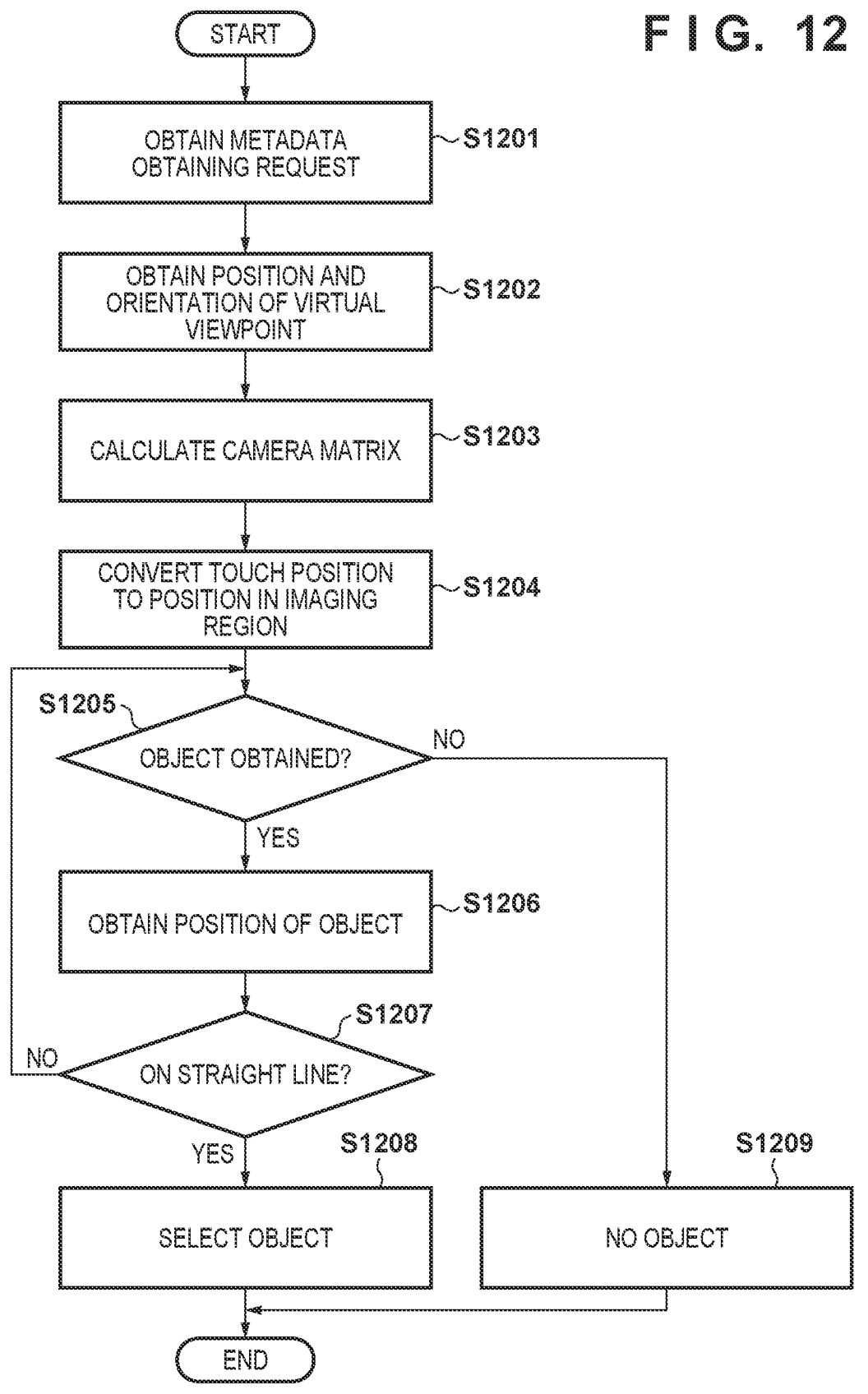

START

OBTAIN METADATA
OBTAINING REQUEST — S1201

OBTAIN POSITION AND
ORIENTATION OF VIRTUAL
VIEWPOINT — S1202

CALCULATE CAMERA MATRIX — S1203

CONVERT TOUCH POSITION
TO POSITION IN IMAGING
REGION — S1204

S1205 — OBJECT OBTAINED?      NO

YES

OBTAIN POSITION OF OBJECT — S1206

S1207 — ON STRAIGHT LINE?

NO

YES          S1208                          S1209

SELECT OBJECT                NO OBJECT

END

F I G. 13A
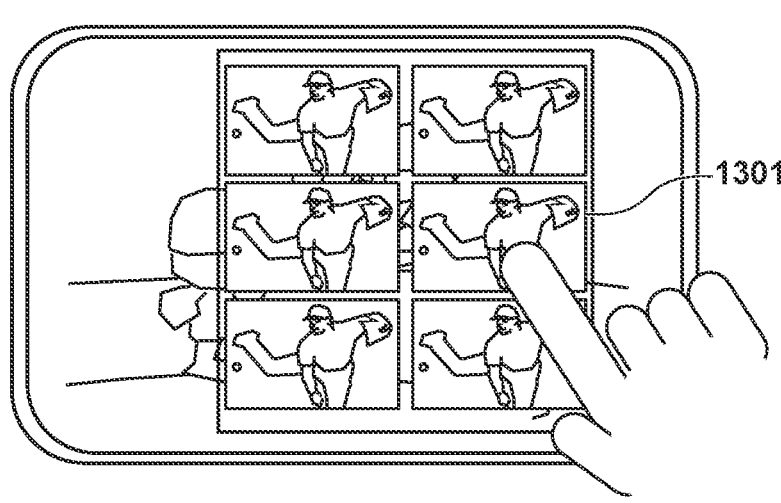
1301
F I G. 13B
1302
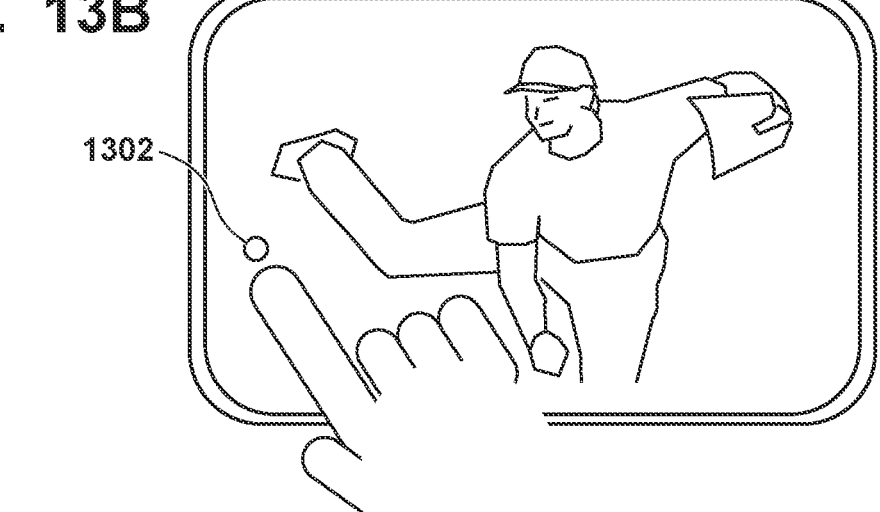
F I G. 13C
1303
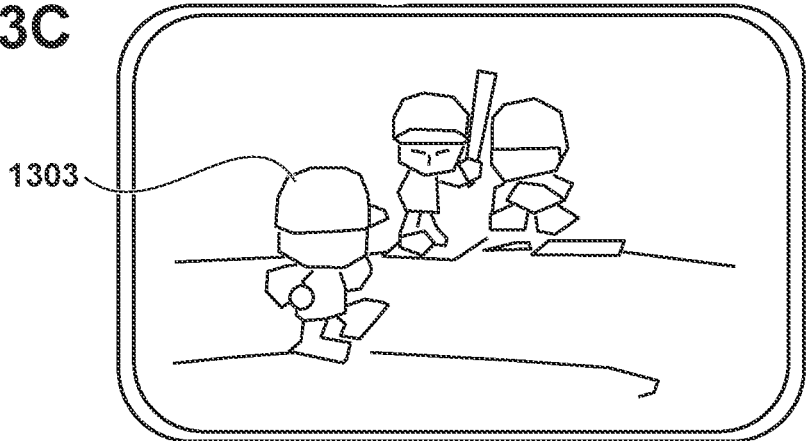

F I G. 14
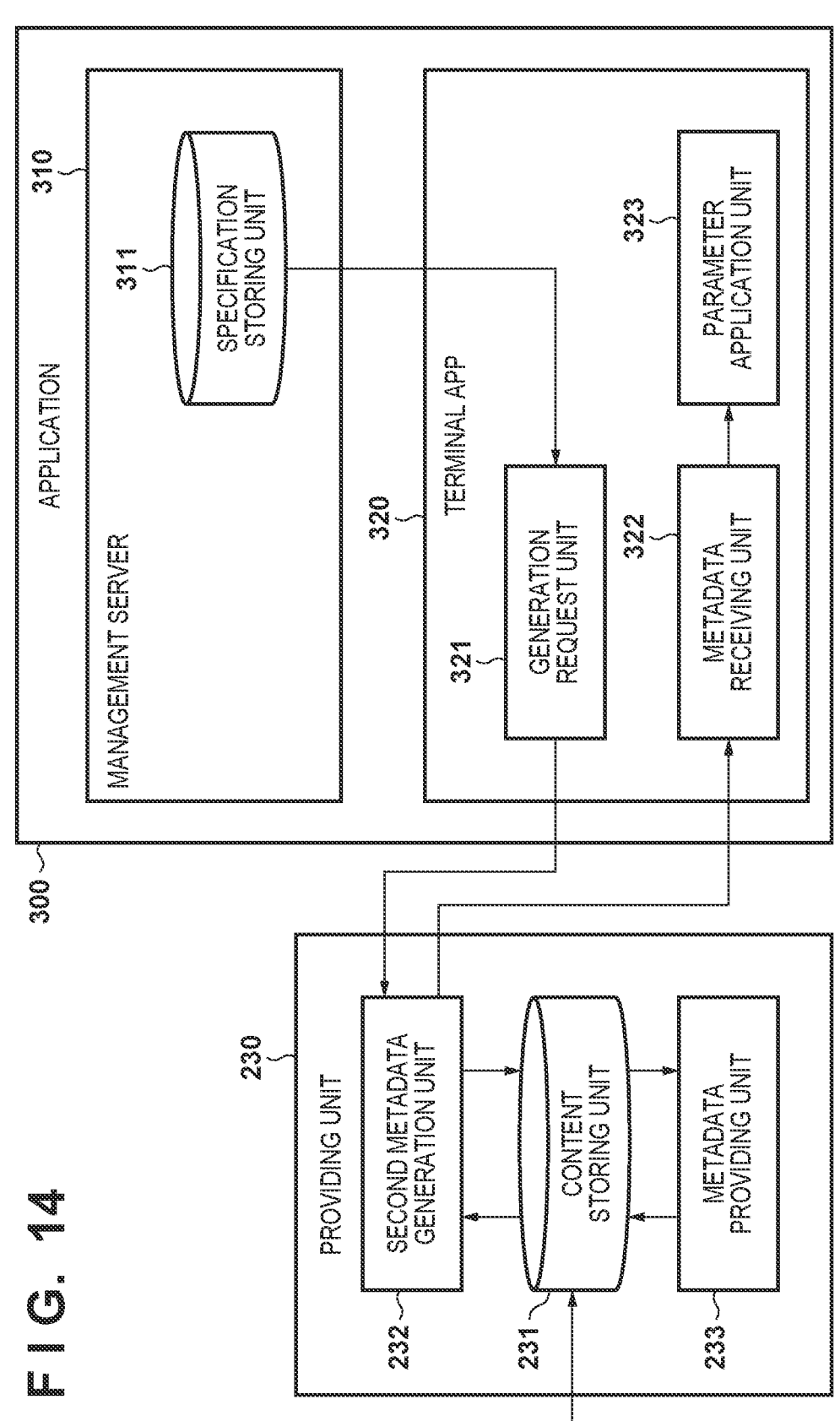

INFORMATION PROCESSING APPARATUS, INFORMATION PROCESSING METHOD, AND NON-TRANSITORY COMPUTER-READABLE MEDIUM FOR GENERATING METADATA ON A 3D MODEL OF AN OBJECT

BACKGROUND

Field

The present disclosure relates to an information processing apparatus, an information processing method, and a non-transitory computer-readable medium and particularly relates to digital content including virtual viewpoint video.

Description of the Related Art

A technique for generating a virtual viewpoint image from a designated virtual viewpoint using a plurality of images obtained by a plurality of image capture apparatuses has been gathering attention. Japanese Patent Laid-Open No. 2015-45920 describes a method for generating such a virtual viewpoint image. As described in Japanese Patent Laid-Open No. 2015-45920, a plurality of image capture apparatuses are placed at different positions. An object is imaged using the plurality of image capture apparatuses. Then, the three-dimensional shape of the object is deduced from the captured images. Using the three-dimensional model (3D model) of the object obtained in this manner, a virtual viewpoint image is generated.

SUMMARY

According to an embodiment, an information processing apparatus comprises one or more memories storing instructions, and one or more processors that execute the instructions to: obtain information on a 3D model of an object; generate metadata on the 3D model of the object on a basis of the information in accordance with a metadata generation request including a metadata type designation; and transmit the metadata on the 3D model of the object generated in accordance with the generation request.

According to another embodiment, an information processing method comprises: obtaining information on a 3D model of an object; generating metadata on the 3D model of the object on a basis of the information in accordance with a metadata generation request including a metadata type designation; and transmitting the metadata on the 3D model of the object generated in accordance with the generation request.

According to still another embodiment, a non-transitory computer-readable medium stores a program executable by a computer to perform a method comprising: obtaining information on a 3D model of an object; generating metadata on the 3D model of the object on a basis of the information in accordance with a metadata generation request including a metadata type designation; and transmitting the metadata on the 3D model of the object generated in accordance with the generation request.

Further features of the present disclosure will become apparent from the following description of exemplary embodiments (with reference to the attached drawings).

BRIEF DESCRIPTION OF THE DRAWINGS

FIG. 2 is a diagram illustrating an example of the functional configuration of an information processing apparatus according to an embodiment.

FIG. 4 is a diagram illustrating an example of the data structure of digital content.

FIG. 7 is a diagram illustrating an example of the data structure of digital content.

FIG. 8 is a diagram illustrating an example of metadata specification.

FIG. 9 is a flowchart for digital content generation processing according to an embodiment.

FIG. 11 is a flowchart for metadata obtaining processing according to an embodiment.

FIG. 12 is a flowchart for object selection processing according to an embodiment.

FIGS. 13A to 13C are diagrams illustrating UI examples for using digital content.

FIG. 14 is a diagram illustrating an example of the functional configuration of an application according to an embodiment.

DESCRIPTION OF THE EMBODIMENTS

Figure 1:
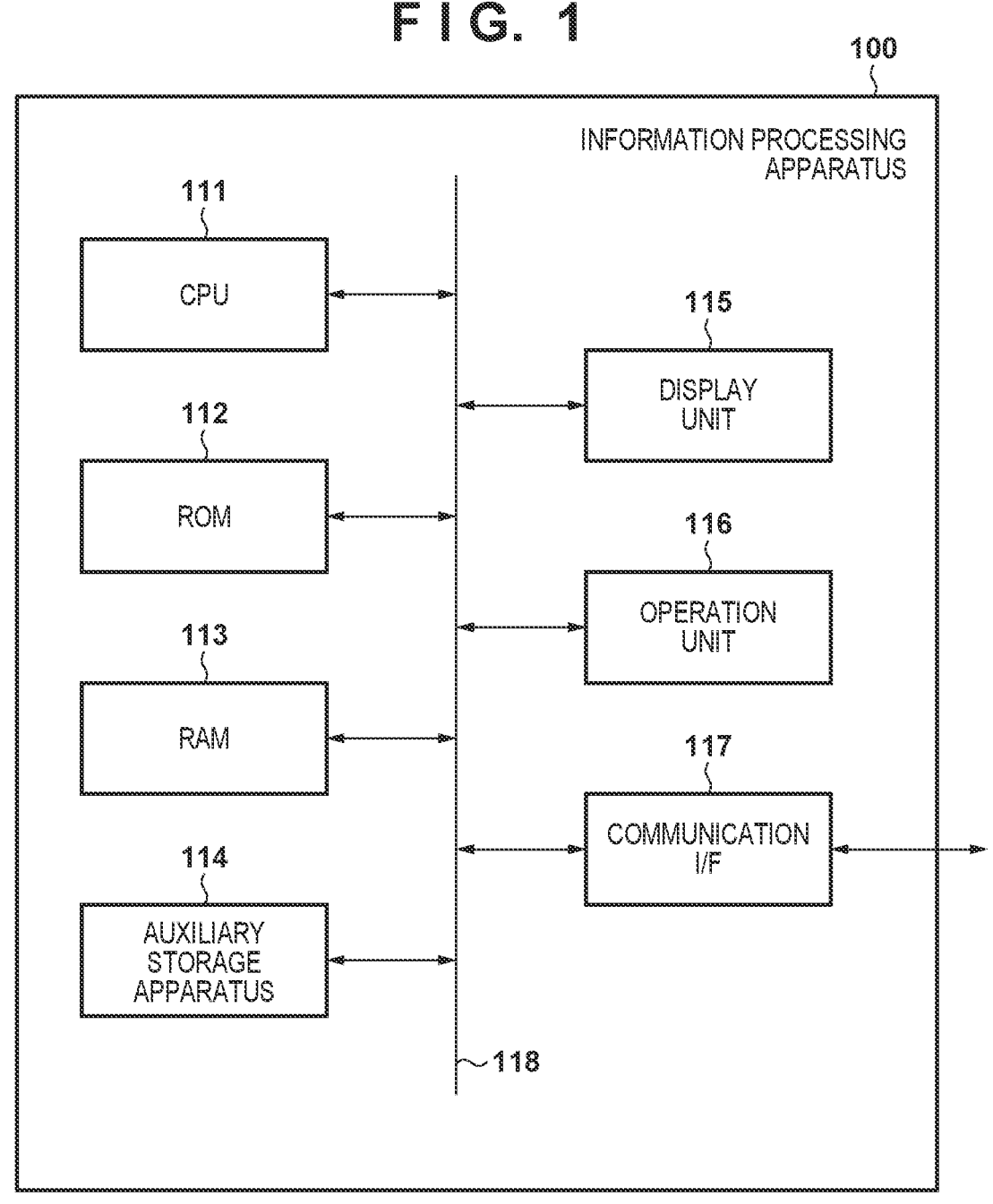
FIG. 1 is a diagram illustrating an example of the hardware configuration of an information processing apparatus according to an embodiment.

Hereinafter, embodiments will be described in detail with reference to the attached drawings. Note, the following embodiments are not intended to limit the scope of the claims. Multiple features are described in the embodiments, but limitation is not made to an embodiment that requires all such features, and multiple such features may be combined as appropriate. Furthermore, in the attached drawings, the same reference numerals are given to the same or similar configurations, and redundant description thereof is omitted.

There is a demand for content that is appealing to users to be provided on the basis of a technique for generating virtual viewpoint images as described above. The inventors of the present application tried to develop an application program that can provide more appealing content by accessing the deduction result for the three-dimensional shape of an object generated by a technique for generating a virtual viewpoint image. However, the information that can be provided to an application program from a system that generates virtual viewpoint images is limited.

In an embodiment of the present disclosure, content that is appealing to users can be provided by using information on the deduction result of the three-dimensional shape of an object used when generating a virtual viewpoint image.

Hardware Configuration

An information processing apparatus according to an embodiment can provide metadata on a 3D model of an object. FIG. 1 is a diagram illustrating an example of the hardware configuration of such an information processing apparatus 100. The information processing apparatus 100 includes a CPU 111, ROM 112, RAM 113, an auxiliary storage apparatus 114, a display unit 115, an operation unit 116, a communication I/F 117, and a bus 118.

The CPU 111 controls the entire information processing apparatus 100 using computer programs or data stored in the ROM 112 or RAM 113. In the present embodiment, a program for implementing the function of each unit stored in the ROM 112 is read out to the RAM 113. Then, the CPU 111 operates according to the program on the RAM 113 to implement each function of the information processing apparatus 100 illustrated in FIG. 2. Note that the information processing apparatus 100 may include one or more dedicated pieces of hardware different from the CPU 111. In this case, the dedicated hardware can implement at least one of the functions of the information processing apparatus 100 illustrated in FIG. 2. Examples of dedicated hardware include an application specific integrated circuit (ASIC), a field-programmable gate array (FPGA), and a digital signal processor (DSP).

The ROM 112 can store a program that does not require change. The RAM 113 can temporarily store programs and data. The RAM 113 can store programs and data supplied from the auxiliary storage apparatus 114 or data supplied from an external source via the communication I/F 117. The auxiliary storage apparatus 114 is a hard disk drive, for example. The auxiliary storage apparatus 114 stores various types of data such as image data and audio data.

The display unit 115 is, for example, a liquid crystal display, an LED display apparatus, or the like. The display unit 115, for example, can display a graphical user interface (GUI) used by the user to operate the system. The operation unit 116 inputs various types of instructions to the CPU 111 in accordance with user operations. The operation unit 116 may be, for example, a keyboard, a mouse, a joystick, or a touch panel. Note that in FIG. 1, the display unit 115 and the operation unit 116 are illustrated as being located inside the information processing apparatus 100. However, the display unit 115 and/or the operation unit 116 may be a separate apparatus from the information processing apparatus 100 that is connected to the outer side of the information processing apparatus 100.

The communication I/F 117 is used to communicate with apparatuses external to the information processing apparatus 100. For example, in a case where the information processing apparatus 100 is connected to an external apparatus via a wired connection, a communication cable is connected to the communication I/F 117. Also, in a case where the information processing apparatus 100 includes a function for wirelessly communicating with an external apparatus, the communication I/F 117 may include an antenna. The bus 118 connects each unit described above and transfers information.

Functional Configuration

Figure 2:
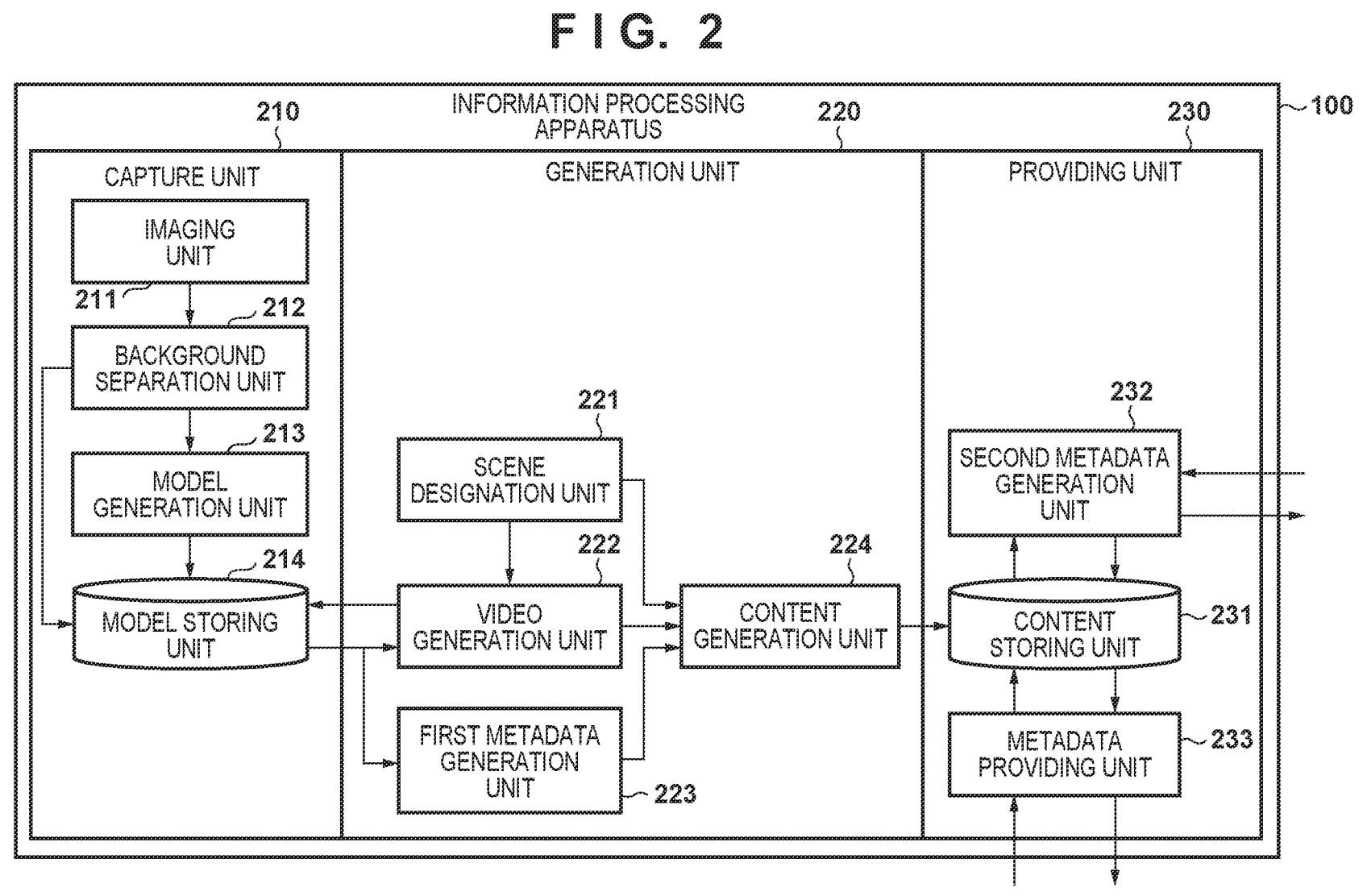

FIG. 2 is a diagram illustrating an example of the functional configuration of the information processing apparatus 100. The information processing apparatus 100 includes a capture unit 210, a generation unit 220, and a providing unit 230. Also, the capture unit 210 includes an imaging unit 211, a background separation unit 212, a model generation unit 213, and a model storing unit 214. The generation unit 220 includes a scene designation unit 221, a video generation unit 222, a first metadata generation unit 223, and a content generation unit 224. The providing unit 230 includes a content storing unit 231, a second metadata generation unit 232, and a metadata providing unit 233.

The information processing apparatus 100 illustrated in FIG. 2 can be implemented using a computer. The computer can include the configuration illustrated in FIG. 1. Examples of computers include, for example, a server, a desktop computer, a laptop computer, a tablet PC, and a smartphone. Each system may be configured by a plurality of information processing apparatuses connected via a network. For example, each system function may be provided as a cloud service. Also, two or more system functions may be implemented in one information processing apparatus.

Figure 3:
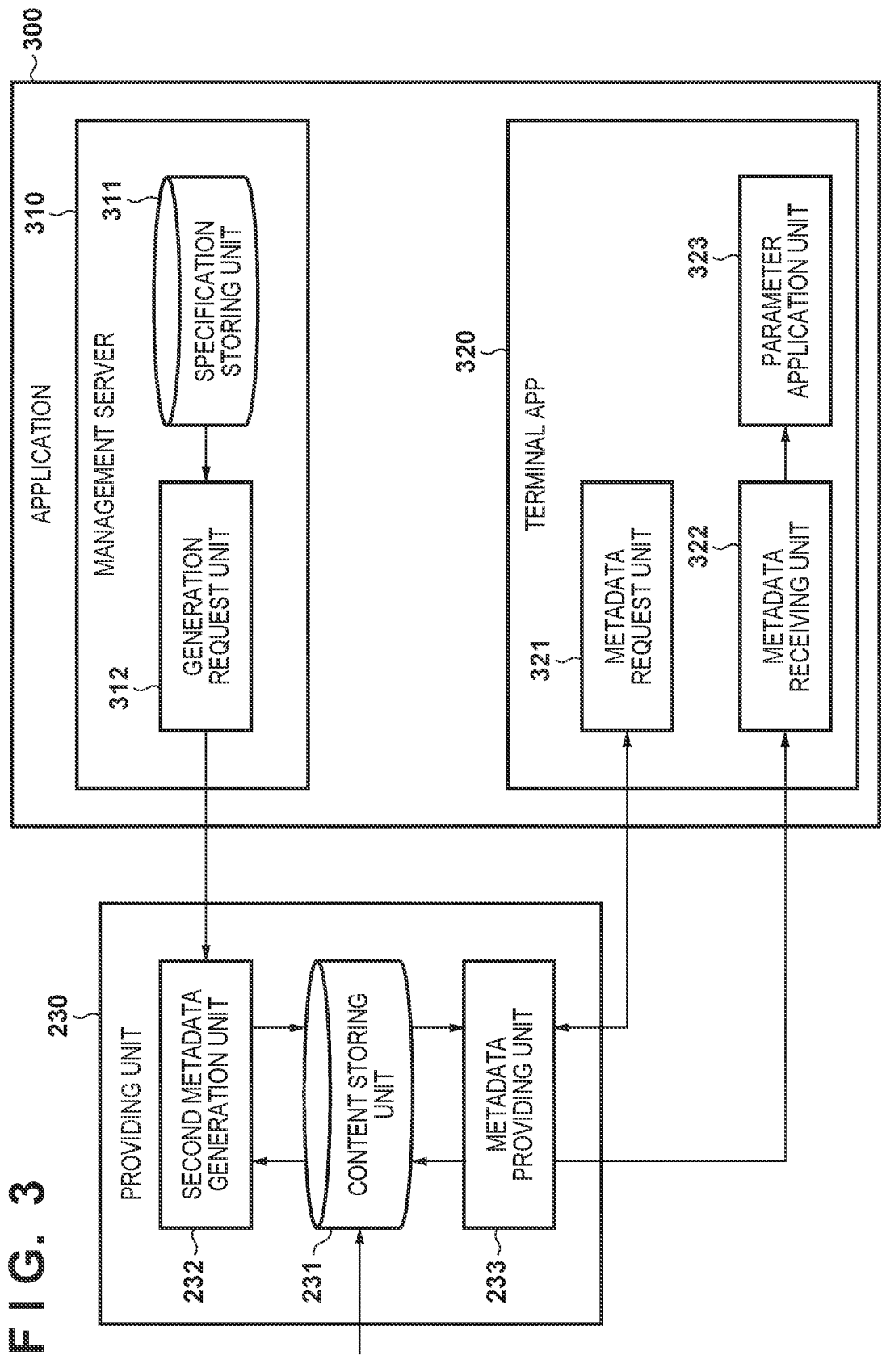
FIG. 3 is a diagram illustrating an example of the functional configuration of an application according to an embodiment.

FIG. 3 is a diagram illustrating the functional configuration of an application (app) 300. The app 300 can operate in cooperation with digital content generated by the information processing apparatus 100. The app 300 includes a management server 310 and a terminal app 320. Also, the management server 310 includes a specification storing unit 311 and a generation request unit 312. The terminal app 320 includes a metadata request unit 321, a metadata receiving unit 322, and a parameter application unit 323. Note that in FIG. 3, only the functions for operating in cooperation with the information processing apparatus 100 are illustrated. In FIG. 3, functions for implementing the operations of the app are omitted. Also, the management server 310 and the terminal app 320 can be implemented using a computer such as that illustrated in FIG. 1. For example, the management server 310 may be a server computer. Also, the terminal app 320 may be an application that operates on a portable terminal such as a smartphone.

Each function of the information processing apparatus 100 and the app 300 will be described below. A case in which the information processing apparatus 100 generates digital content for a baseball scene will be described below. Also, the app 300 is a baseball game application. However, the type of the digital content is not particularly limited.

First, the capture unit 210 included in the information processing apparatus 100 will be described. The capture unit 210 generates a 3D model of an object on the basis of captured images.

The imaging unit 211 includes a plurality of image capture apparatuses. Each image capture apparatus images an imaging region from different directions. The imaging region is not particularly limited. Examples of an imaging region include a stadium where a sport such as soccer or baseball is played and a venue where a concert or entertainment is performed. The plurality of image capture apparatuses may be placed surrounding the imaging region at different positions and facing different directions. Note that the image capture apparatuses may not be placed around the entire circumference of the imaging region. For example, the image capture apparatuses may only be placed in regions in a predetermined direction from the imaging region. Also, the plurality of image capture apparatuses may include various types of image capture apparatuses. For example, the plurality of image capture apparatuses may include image capture apparatuses with different functions, such as a telephoto camera and a wide-angle camera.

The background separation unit 212 separates the captured images captured by each of the plurality of image capture apparatuses of the imaging unit 211 into foreground images and background images. The background separation unit 212 performs this separation using a background subtraction method, for example.

A foreground image is an image of a region of an object (foreground region) extracted from a captured image. The extracted object may be a moving body (with changing position and shape) with movement across an image group of a time series obtained by imaging from the same direction. Examples of an object include a person such as a player or referee on the field at a sports event and an object (a ball in the case of a ball sport) that is the focus of play. Also, in the case of a concert or an entertainment event, the object may be a person such as a singer, a player, a performer, a presenter, and the like.

A background image is an image of a region (background region) different from the object extracted at least as the foreground. For example, a background image is an image obtained by removing the object, that is, the foreground, from a captured image. Also, the background may be an imaging target object if it is stationary or close to a continuously stationary state across an image group of a time series obtained by imaging from the same direction. Examples of such an imaging target object include a sports stadium, a concert venue, a structure used in sports such as a goal, and a sports field. Note that the imaging target object may include, in addition to an object and a background, another object or the like. Also, the object does not need to be a moving body. The object may be a stationary object, or the object may include the background.

The model generation unit 213 generates a 3D model of the object on the basis of images of the object captured by the plurality of image capture apparatuses. In the present embodiment, the model generation unit 213 generates a 3D model of the object on the basis of foreground images obtained by the background separation unit 212. The 3D model represents the three-dimensional shape deduced for the object. The model generation unit 213, for example, can generate a 3D model of the object using the visual volume intersection method. An example of the format of the 3D model of the object includes a mesh model.

Also, the model generation unit 213 can generate texture data for the 3D model of the object. Such texture data is used for coloring the 3D model of the object. The model generation unit 213 can generate such texture data on the basis of the foreground image obtained by the background separation unit 212. For example, the model generation unit 213 can project the components (for example, polygons) of the 3D model on the captured image on the basis of the camera parameters of the image capture apparatuses. Then, the model generation unit 213 can extract a texture image from the region in the captured image corresponding to the projected components. Such a texture image can be used as texture data corresponding to the components.

By executing the processing described above on the basis of the foreground images obtained from the captured image group of each time, the model generation unit 213 can obtain a 3D model of the object and texture data for each time. In this manner, the model generation unit 213 can generate a 3D model of a time series indicating the position and shape of the object. The shape indicated by the 3D model generated by the model generation unit 213 may change over time in terms of position, pose, and/or shape. Also, the model generation unit 213 can generate texture data of a time series indicating the external appearance of the object.

The model storing unit 214 stores the 3D model of the object generated by the model generation unit 213. Also, the model storing unit 214 can store the texture data of the object generated by the model generation unit 213.

Also, the model storing unit 214 may store a 3D model of the background. Such a 3D model can represent the three-dimensional shape of an imaging target object corresponding to a stadium, a venue, or a similar background. The background 3D model may be generated by three-dimensionally measuring a stadium, a venue, or a similar background in advance. An example of the format of the 3D model of the background includes a mesh model. Also, the model storing unit 214 may store the texture data of the background 3D model. Such texture data is used for coloring the 3D model of the background. Such texture data may be generated on the basis of a background image obtained by the background separation unit 212.

Next, the generation unit 220 included in the information processing apparatus 100 will be described. The generation unit 220 generates a virtual viewpoint video on the basis of the 3D model of the object. Note that the generation unit 220 may generate a virtual viewpoint video on the basis of the 3D model of the object generated by another apparatus different from the information processing apparatus 100.

The scene designation unit 221 generates scene information indicating information relating to the scene. In the present embodiment, one piece of digital content correlates to one scene. The scene information may be associated with the 3D model (for example, the 3D model of the object and background) used to generate the virtual viewpoint video included in the digital content.

Scenes may be divided by a certain play. For example, one scene may show from a pitcher getting ready to pitch a ball until the ball is in the catcher glove. Also, one scene may show a series of a pitcher pitching a ball, a batter hitting the ball, and a double play being made.

The scene information may include information designating the virtual viewpoint. For example, the scene information may include a camera path. A camera path is information indicating change over time in the position and orientation of the virtual camera (virtual viewpoint) capturing the virtual viewpoint video. For example, the camera path can represent the position and orientation of the virtual viewpoint at each time of the scene.

Also, the scene information may include information indicating the scene situation. The information indicating the scene situation may be additional information not shown by the virtual viewpoint video, the 3D model, or the texture data. Examples of the information indicating the scene situation include information such as the match-up, the innings, and the ball count.

The digital content provider can designate the scene. In other words, the scene designation unit 221 can generate scene information in accordance with input by the digital content provider. Note that the scene designation unit 221 may generate scene information in accordance with previously generated data. For example, the scene designation unit 221 may generate information designating a virtual viewpoint in accordance with information indicating a camera path that has been used in the broadcast or streaming of a game. Also, the scene designation unit 221 may generate information indicating the scene situation on the basis of onscreen text that has been used in the broadcast or streaming of a game.

Note that the scene designation unit 221 may designate the scene time (for example, the start time and the end time). Here, the video generation unit 222 can generate a virtual viewpoint video based on the 3D model and texture data of a time series in the designated time.

The video generation unit 222 generates a virtual viewpoint image on the basis of the 3D model of the object. For example, the video generation unit 222 can map the texture data on the 3D model of the object and the 3D model of the background. Also, the video generation unit 222 can render the object and the background according to the camera path designated by the scene designation unit 221. The video generation unit 222 can generate a virtual viewpoint image of each time forming a virtual viewpoint video by executing the processing described above. In this manner, the video generation unit 222 can generate a virtual viewpoint video corresponding to one scene.

Also, the video generation unit 222 sends the 3D model of the object to the first metadata generation unit 223. The 3D model is the 3D model used in generating the virtual viewpoint video, or in other words, a 3D model of the object shown in the virtual viewpoint video.

The first metadata generation unit 223 generates metadata (first metadata) on the basis of the 3D model of the object used to generate the virtual viewpoint video. The metadata generated by the first metadata generation unit 223 may be included in the digital content. The metadata generated by the first metadata generation unit 223 may be information on the 3D model of the object. For example, the metadata can indicate the position, the pose, and/or the shape of the object.

An example of the metadata generated by the first metadata generation unit 223 includes metadata indicating information on the position of the object. For example, the first metadata generation unit 223 can obtain a bounding box surrounding the 3D model of the object. Then, the first metadata generation unit 223 can calculate the center coordinates of the bounding box as the position of the object. The first metadata generation unit 223 can obtain the position of the object at each time of the scene. In this case, the metadata can include a combination of time information and object position information.

Another example of the metadata generated by the first metadata generation unit 223 includes metadata indicating information on the pose of the object. The first metadata generation unit 223 can generate metadata indicating the pose information in addition to the position information for a human object. The first metadata generation unit 223 can deduce the pose of the object on the basis of the 3D model of the object and the texture data using any pose deduction technique. The deduction result can be represented by the position of each joint of a person. The first metadata generation unit 223 can obtain the pose of the object at each time of the scene. In this case, the metadata can include a combination of time information and position information of each joint of the object.

The 3D model of the object may represent the shape of two or more objects. The first metadata generation unit 223 may separately recognize two or more object represented by their 3D model. For example, the first metadata generation unit 223 can recognize an object represented by the 3D model of the object using any object recognition technique. Here, the first metadata generation unit 223 can recognize whether each object represented by a 3D model is a person (a pitcher, catcher, or the like) or a ball. At this time, the first metadata generation unit 223 can generate metadata for each recognized object. The capture unit 210 may generate a separate 3D model corresponding to each one of two or more objects. In this case, the first metadata generation unit 223 can generate metadata for each object.

Also, the first metadata generation unit 223 may recognize the type of object. Then, the first metadata generation unit 223 may generate metadata indicating information on the type of object.

Note that 3D models representing the shapes of all of the objects included in the imaging region can be stored in the model storing unit 214. On the other hand, the first metadata generation unit 223 may generate metadata for only objects shown in the virtual viewpoint video.

The content generation unit 224 generates digital content including the virtual viewpoint video. For example, the digital content can include the virtual viewpoint video generated by the video generation unit 222. Also, the digital content can include the metadata generated by the first metadata generation unit 223. The digital content can include the scene information generated by the scene designation unit 221.

Next, the providing unit 230 included in the information processing apparatus 100 will be described. The providing unit 230 generates metadata (second metadata) on the 3D model of the object. In the following example, the providing unit 230 generates the second metadata on the basis of the metadata (first metadata) generated by the first metadata generation unit 223. On the other hand, the providing unit 230 may generate the second metadata on the basis of the first metadata on the 3D model of the object generated by another apparatus different from the information processing apparatus 100. Also, the providing unit 230 may generate the second metadata on the basis of the 3D model generated by the capture unit 210 or generated by another apparatus different from the information processing apparatus 100.

The content storing unit 231 stores the information on the 3D model of the object. The information on the 3D model of the object is, for example, the first metadata generated by the first metadata generation unit 223. On the other hand, the information on the 3D model of the object may be the 3D model of the object itself. In the present embodiment, the content storing unit 231 stores the digital content generated by the content generation unit 224.

The second metadata generation unit 232 generates metadata on the 3D model of the object in response to a metadata generation request. In the present embodiment, the metadata generation request is transmitted from the generation request unit 312. The metadata generation request includes a designation of the type of metadata. The second metadata generation unit 232 can generate metadata in accordance with the designation of the type of metadata included in the generation request. The type of metadata may be, for example, pitch type, pitch speed, sharpness (Kire or spin), pitching style, speed of the pitch action, and the like. Also, the second metadata generation unit 232 can generate such metadata on the basis of the information on the 3D model of the object stored in the content storing unit 231.

Also, the second metadata generation unit 232 can stores the generated metadata in the content storing unit 231. In other words, the content storing unit 231 can store the metadata on the 3D model of the object generated in accordance with the metadata generation request. The content storing unit 231 can store the metadata generated by the second metadata generation unit 232 in association with the virtual viewpoint video generated by the video generation unit 222. For example, the content storing unit 231 can include the metadata generated by the second metadata generation unit 232 in the digital content. In this embodiment, the metadata generated by the second metadata generation unit 232 is a parameter that can be used by the app 300. The metadata will be described below in detail.

The metadata providing unit 233 transmits the metadata on the 3D model of the object generated in accordance with the metadata generation request. The metadata providing unit 233 can transmit the metadata generated by the second metadata generation unit 232 to the app 300. In the present embodiment, the metadata providing unit 233 obtains a metadata obtaining request. The metadata obtaining request is transmitted from the app 300 separately from the metadata generation request. The metadata providing unit 233 transmits the metadata in accordance with the metadata obtaining request. Specifically, the metadata providing unit 233 can obtain the metadata designated in the metadata obtaining request from the content storing unit 231. Then, the metadata providing unit 233 can transmit the obtained metadata to the app 300.

Note that the metadata providing unit 233 may transmit a portion or all of the digital content stored in the content storing unit 231 to the app 300. For example, the metadata providing unit 233 may transmit the virtual viewpoint video included in the digital content to the app 300. At this time, the user can select the object using the virtual viewpoint video. Then, the metadata providing unit 233 can transmit the metadata on the selected object to the app 300. Such a method is described below in detail with reference to FIG. 11. The metadata providing unit 233 may control whether to transmit a portion or all of the digital content (for example, the virtual viewpoint video or the metadata) to the app 300 according to whether or not the user has the right to use the digital content. In other words, in a case where the user of the app 300 has the right pertaining to the digital content, the metadata providing unit 233 can transmit a portion or all of the digital content to the app 300.

The specification storing unit 311 stores the information indicating the specification of the metadata generated by the second metadata generation unit 232. In the present specification, this information is referred to as metadata specification. Metadata specification can include information designating the digital content that is the target of processing for generating the metadata. In the present embodiment, such metadata specification is predetermined according to the processing to be executed by the app 300 using the metadata.

Also, the metadata specification can include information designating the type of metadata to be requested for generation. For example, the specification storing unit 311 can store information on a parameter usable by the app 300.

Also, the metadata specification can include information designating the metadata generation method. For example, the information designating the metadata generation method may designate information on the 3D model of the object to be used to generate the metadata. Specifically, the information designating the metadata generation method can include information designating existing metadata (for example, the first metadata) to be used to generate the metadata. Also, the information designating the metadata generation method may include information indicating metadata determination criteria. The information indicating the metadata determination criteria can include information on reference data or a threshold to be used to generate the metadata as described below.

The generation request unit 312 transmits the metadata generation request to the second metadata generation unit 232. For example, the generation request unit 312 can transmit the generation request to the second metadata generation unit 232 to generate metadata usable by the app 300. The metadata generation request can include the metadata specification stored by the specification storing unit 311.

The metadata request unit 321 transmits the metadata obtaining request to the metadata providing unit 233. The obtaining request may include information designating specified metadata for specified digital content stored in the content storing unit 231. For example, the metadata request unit 321 can request for metadata to be used by the terminal app 320 from the metadata providing unit 233.

Also, the user of the app 300 may have the right to use specified digital content. In the present specification, the user having the right to use digital content is referred to as "the user possessing digital content". The metadata obtaining request may designate, of the digital content stored by the content storing unit 231, the metadata of the digital content possessed by the user of the app 300.

The metadata receiving unit 322 receives the metadata transmitted from the metadata providing unit 233.

The parameter application unit 323 operates in accordance with the metadata received by the metadata receiving unit 322. For example, the parameter application unit 323 may control the operation of the terminal app 320 in accordance with the parameter retrieved from the metadata. For example, the parameter application unit 323 can apply the parameter to a character in operation in the terminal app 320. For example, the metadata may indicate metadata on a pitch. In this case, the parameter application unit 323 can control the operation of the terminal app 320 so that a pitcher character performs a pitch according to this parameter.

The metadata generation request and a method for generating the metadata using the second metadata generation unit 232 will be described below. In the present embodiment, the second metadata generation unit 232 generates the metadata in response to the metadata generation request obtained by the app 300.

Also, in the present embodiment, the second metadata generation unit 232 generates the second metadata on the basis of the first metadata generated by the first metadata generation unit 223. Here, the second metadata generation unit 232 can use the existing metadata generated by the first metadata generation unit 223. The existing metadata is information on the 3D model of the object generated by the first metadata generation unit 223 on the basis of the 3D model of the object before a metadata generation request is obtained, for example. The existing metadata may indicate the position and pose of the 3D model of the object as described above.

The metadata generation request transmitted from the app 300 can include a designation of the type of the metadata as described above. Thus, the second metadata generation unit 232 can generate second metadata specific to the app 300 from generic metadata independent of the app 300 such as the first metadata.

The type of the metadata generated by the second metadata generation unit 232 is not particularly limited. For example, the second metadata generation unit 232 can generate metadata indicating the movement of the object. Examples of such metadata include, for example, the pitch type, pitch speed, sharpness, pitching style, and speed of the pitch action. Also, the second metadata generation unit 232 can generate metadata indicating the speed of the movement of the object. Examples of such metadata include, for example, the pitch speed and the speed of the pitch action described below. Also, the second metadata generation unit 232 can generate metadata indicating the classification result of the movement of the object. Examples of such metadata include, for example, the pitch type, pitch speed, sharpness, pitching style, and speed of the pitch action. Also, the second metadata generation unit 232 can generate metadata indicating the classification result of the pose of the object. Examples of such metadata include, for example, the pitch type described below.

For example, the second metadata generation unit 232 can generate metadata on the pitch. Metadata on the pitch can include one or more parameters on the pitch including pitch type, pitch speed, sharpness, and the like. The second metadata generation unit 232 can generate such metadata on the basis of metadata on the position of the ball object generated by the first metadata generation unit 223.

The second metadata generation unit 232 can generate a parameter indicating the pitch type on the basis of the trajectory (change in position over time) of the ball object. Examples of the pitch type include straight, change-up, slider, curveball, forkball, and the like. The second metadata generation unit 232 can determine the pitch type on the basis of the standard trajectory of each pitch type. For example, the second metadata generation unit 232 can compare the trajectory of the ball object with each one of a plurality of standard trajectories. Such a comparison can be performed by calculating the mean squared error for the ball position at each time, for example. When the error is low, it can be determined that the trajectories are similar. Then, the second metadata generation unit 232 can specify the standard trajectory that is most similar to the trajectory of the ball object from among the plurality of standard trajectories. The second metadata generation unit 232 can generate a parameter indicating the pitch type corresponding to the standard trajectory determined in this manner as the parameter on the pitch type.

The second metadata generation unit 232 can generate a parameter indicating the pitch speed on the basis of the trajectory of the ball object. For example, the second metadata generation unit 232 can generate a parameter indicating the pitch speed by dividing the change in position by the change in time.

Also, the second metadata generation unit 232 can determine a parameter indicating the sharpness of the pitch using the ball position when it passes over the home plate. For example, information indicating the standard position of a ball when it passes over the home plate can be prepared in advance. Also, the second metadata generation unit 232 can obtain the difference between the position of the ball object when it passes over the home plate and the standard position. The second metadata generation unit 232 can determine the parameter indicating the sharpness by comparing the determined difference and a pre-prepared threshold. For example, the second metadata generation unit 232 can generate a parameter indicating "good sharpness" if the difference is 40 cm or greater. In a similar manner, the second metadata generation unit 232 can generate a parameter indicating "normal sharpness" if the difference is from 20 cm to 40 cm. Also, the second metadata generation unit 232 can generate a parameter indicating "bad sharpness" if the difference is less than 20 cm. Note that the standard position of a ball when it passes over the home plate may be determined in accordance with the trajectory of the ball immediately after it is thrown.

Also, the metadata that the app 300 wants to obtain may be different for each app 300. To accommodate such demands from the app 300, the metadata generation request can include metadata specification as described above.

In this embodiment, a parameter is determined on the basis of the classification result for the movement or the pose of the object. In this case, the metadata can include a parameter selected from a plurality of values. Here, the selected value indicates the classification result. However, depending on the app 300, the movement classification method may be different. For example, the second metadata generation unit 232 can select the determined pitch type from among the plurality of pitch types. Here the number of pitch types may be different. Also, the parameter indicating the sharpness of the pitch does not need to be selected from the three values described above. The parameter indicating the sharpness of the pitch may be selected from two values or four or more values. Here, the metadata specification may include information indicating the number of values that may be selected as a parameter.

Also, in this embodiment, the second metadata generation unit 232 can determine the parameter by comparing a value based on the information on the 3D model with a threshold. For example, the second metadata generation unit 232 can compare a numerical value relating to the position of the 3D model with a threshold. In the example described above, to generate a parameter indicating the sharpness of a pitch, the second metadata generation unit 232 compares the difference between the position of the ball object and the standard position and a threshold. Here, the metadata specification may include information indicating this threshold. Using such a method, the threshold used to generate the parameter indicating the sharpness of the pitch can be changed according to the information included in the metadata generation request.

Also, in this embodiment, the second metadata generation unit 232 can determine a parameter on the basis of a comparison between data based on the information on the 3D model and reference data corresponding to the value that may be selected as the parameter. For example, the second metadata generation unit 232 can compare the movement and pose of the 3D model with reference data on movement and pose. In the example described above, to generate a parameter indicating the pitch type, the second metadata generation unit 232 compares the trajectory of the ball object and a standard trajectory. Here, the metadata specification may include information indicating this reference data. Using such a method, the standard trajectory used to generate the parameter indicating the pitch type can be changed according to the information included in the metadata generation request.

Also, the metadata specification may designate a method for generating data in accordance with the metadata generation request on the basis of the first metadata or the 3D model.

In another example, the second metadata generation unit 232 may generate metadata on the pitch form. The metadata on the pitch form can include one or more parameters on the pitch form including the pitching style, the speed of the pitch action, and the like. The second metadata generation unit 232 can generate such metadata on the basis of metadata on the pose (position of each joint) of the pitcher generated by the first metadata generation unit 223.

For example, the second metadata generation unit 232 can generate a parameter indicating the pitching style on the basis of the pose of the pitcher. The second metadata generation unit 232 can determine the pitching style on the basis of a standard pose for each type of pitching style. For example, the second metadata generation unit 232 can compare the pose of the pitcher object with each one of a plurality of standard pose. Such a comparison can be performed by calculating the mean squared error for the joint positions, for example. When the error is low, it can be determined that the pitching styles are similar. Then, the second metadata generation unit 232 can specify the standard pose that is most similar to the pose of the pitcher object from among the plurality of standard pose. The second metadata generation unit 232 can generate a parameter indicating the pitching style corresponding to the standard pose determined in this manner as the parameter on the pitching style. In this case, the metadata specification may include information indicating the standard pose corresponding to each pitching style.

Also, the second metadata generation unit 232 can generate a parameter indicating the speed (quickness) of the pitch action on the basis of the pose of the pitcher. For example, the second metadata generation unit 232 can analyze the pose of the pitcher using any motion analysis technique. Then, the second metadata generation unit 232 can obtain the start time and end time of the pitch on the basis of the analysis result of the pose. The second metadata generation unit 232 obtains the difference between the start time and the end time of the pitch. The second metadata generation unit 232 can compare the determined difference and a pre-prepared threshold. At this time, the second metadata generation unit 232 can generate a parameter indicating the speed of the pitch action according to the comparison result. For example, the second metadata generation unit 232 can generate a parameter indicating "quick pitch action" if the difference is less than 1.0 seconds. In a similar manner, the second metadata generation unit 232 can generate a parameter indicating "normal speed pitch action" if the difference is from 1.0 seconds to less than 1.5 seconds. Also, the second metadata generation unit 232 can generate a parameter indicating "slow pitch action" if the difference is 1.5 seconds or greater. In this case, the metadata specification may include information indicating this threshold.

Digital Content Data Structure

Next, the data structure of the digital content generated by the information processing apparatus 100 will be described with reference to FIGS. 4, 5, 6, and 7.

The digital content can include a plurality of files (for example, text or video). In the present embodiment, the digital content is represented using a tree structure. The root of the tree structure is a digital content header 401. Also, each file includes information such as an id for uniquely identifying the file, a name indicating the name of the file, and the creator of the file. The creator is, generally, the provider of the digital content and is an "information processing apparatus" in the example of FIGS. 4 to 7. However, in the example of FIGS. 6 and 7, the creator of the metadata generated by the second metadata generation unit 232 in accordance with the metadata generation request is the provider of the app 300 that transmitted the metadata generation request.

As illustrated in FIG. 4, the digital content header 401 includes a virtual viewpoint video 402, a scene data header 403, and object data headers 404 and 405 as children nodes. In the example of FIG. 4, there are two object headers. However, the digital content header 401 can include, as children nodes, the same number of object headers as the objects in the virtual viewpoint video depending on the scene of the digital content.

Figure 5:
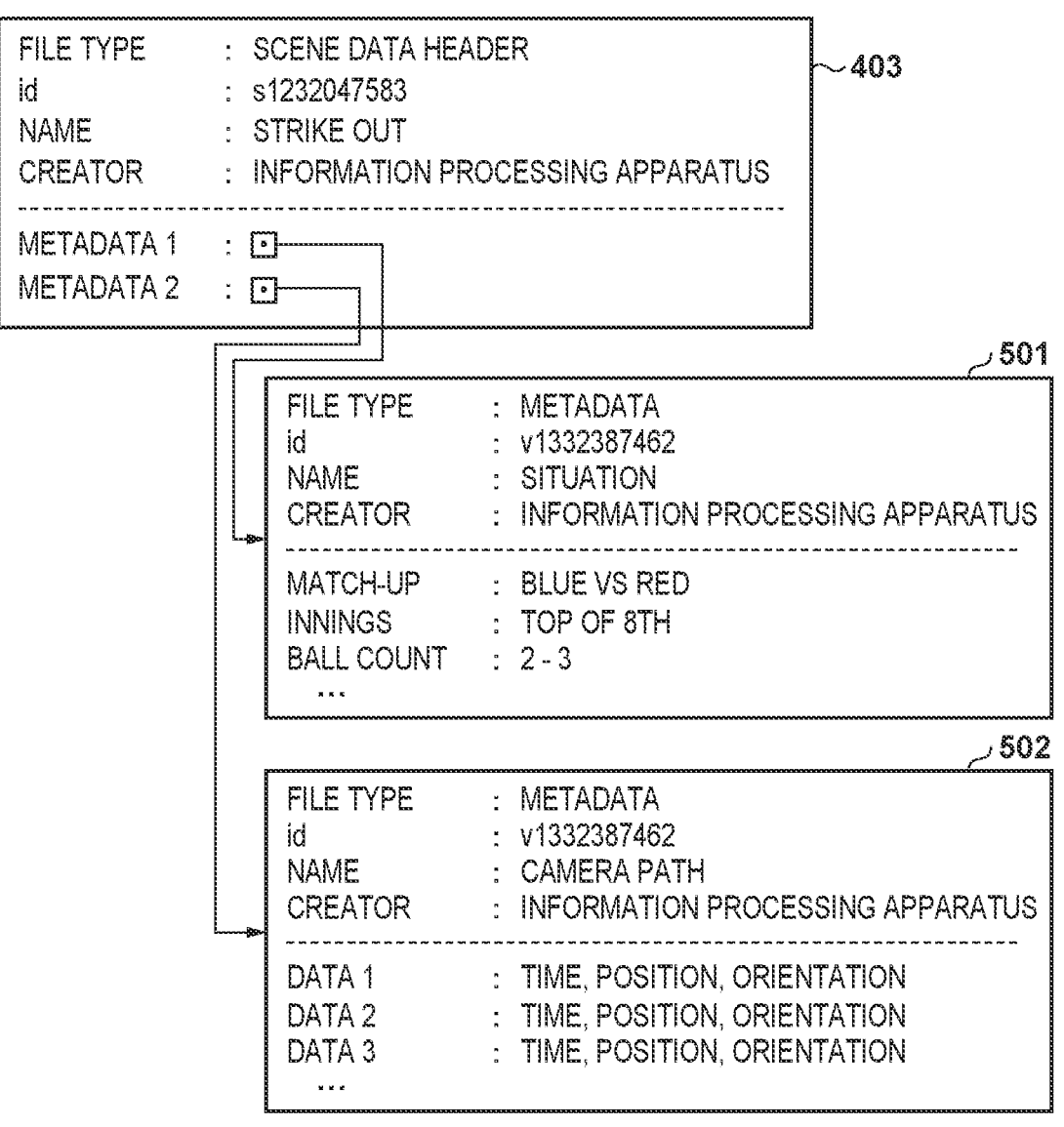
FIG. 5 is a diagram illustrating an example of the data structure of digital content.

As illustrated in FIG. 5, the scene data header 403 includes metadata 501 and 502 as children nodes. The metadata 501 and 502 corresponds to scene information. The metadata 501 includes information for describing the scene situation as described above. Also, the metadata 502 includes the camera path described above. Note that the number of pieces of data included in the metadata 502 depends on the length of the virtual viewpoint video 402. For example, in a case where the length of the virtual viewpoint video 402 is 10 seconds and the frame rate is 60 frames per second, the metadata 502 can include data indicating 600 (10×60) virtual viewpoints.

Figure 6:
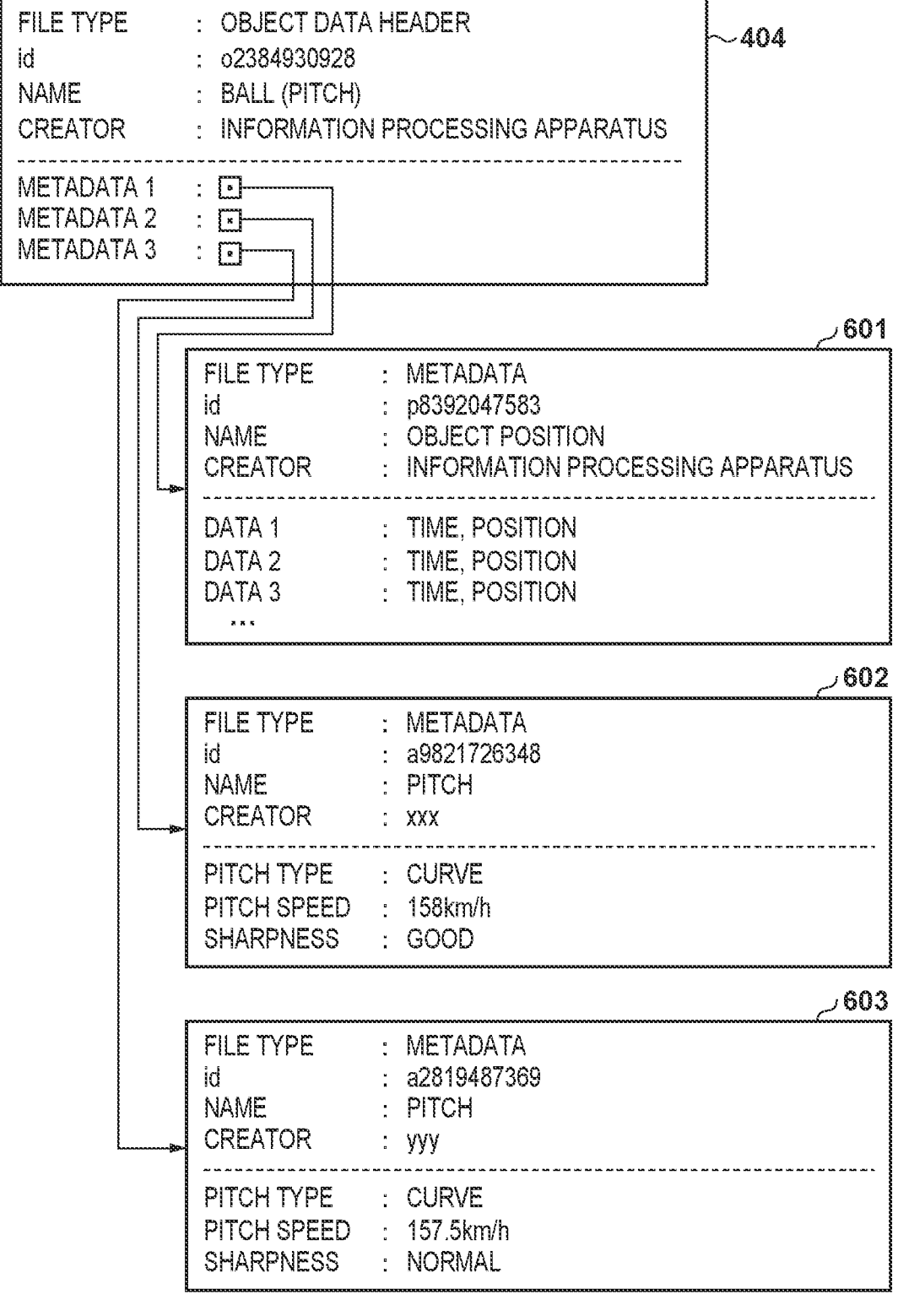
FIG. 6 is a diagram illustrating an example of the data structure of digital content.

As illustrated in FIG. 6, the object data header 404 includes metadata 601, 602, and 603 on the ball object included in the virtual viewpoint video 402 as children nodes.

The metadata 601 includes information on the position of the ball. The metadata 601 can indicate the position of the ball at each time of the virtual viewpoint video 402. In this example, the metadata 601 is the first metadata generated by the first metadata generation unit 223.

The metadata 602 includes the information on the pitch described above. In this example, the metadata 602 is second metadata generated by the second metadata generation unit 232. The creator of the metadata 602 is [xxx] who performed the metadata generation request.

The metadata 603 is metadata different from the metadata 602 and includes information on a pitch. The metadata 603 is also second metadata generated by the second metadata generation unit 232. The creator of the metadata 603 is [yyy]

who performed the metadata generation request. Accordingly, the creator of the metadata 602 and the creator of the metadata 603 are different.

As described above, the content storing unit 231 storing the content data can store the metadata generated by the second metadata generation unit 232 in association with the information indicating the creator of the metadata generation request.

The metadata 602 and the metadata 603 have been generated in accordance with the same metadata (or 3D model of a ball) indicating the position of a ball. However, the metadata 602 and the metadata 603 may have been generated in accordance with different metadata specifications. For example, the metadata 602 and the metadata 603 may include different values for a parameter on sharpness due to an interpretation difference between the creators. In this case, the thresholds used to generate the parameter on sharpness indicated by each metadata specification may be different.

As illustrated in FIG. 7, the object data header 405 includes metadata 701, 702, and 703 on the pitcher object included in the virtual viewpoint video 402 as children nodes.

The metadata 701 includes information on the position of the pitcher. The metadata 701 can indicate the position of the pitcher at each time of the virtual viewpoint video 402.

The metadata 702 includes information on the pose of the pitcher. The metadata 702 can indicate the pose of the pitcher, that is the position of the joints, at each time of the virtual viewpoint video 402. In this example, the joints which are the targets for position deduction by the first metadata generation unit 223 are determined in advance. Also, the arrangement order of the data indicating the position of each joint in the metadata 702 is determined in advance.

The metadata 703 includes the information on the pitch form of the pitcher described above. This metadata is also second metadata generated by the second metadata generation unit 232. Also, the creator of the metadata 703 is [yyy] who performed the metadata generation request.

Metadata Specification

FIG. 8 is a diagram illustrating an example of the metadata specification included in the metadata generation request transmitted from the app 300 to the information processing apparatus 100. As illustrated in FIG. 8, the metadata specification can include information such as the creator of the metadata and the name of the metadata. This information is included in the generated metadata.

Also, the metadata specification illustrated in FIG. 8 includes a digital content header id for uniquely identifying digital content which is the target of the metadata generation processing. Also, in another designation method, the metadata specification may include information designating the attributes of the digital content which is the target of the metadata generation processing. For example, the metadata specification may include information designating a match-up. In this case, all of the digital content relating to the designated match-up correspond to targets of the metadata generation processing. The metadata 501 include information indicating such a match-up as information that describes the scene situation. In this case, the metadata providing unit 233 can reference the metadata 501 to search for digital content relating to the designated match-up from among all of the digital content stored in the content storing unit 231.

Also, the metadata specification illustrated in FIG. 8 includes a metadata id for uniquely identifying an existing first metadata to be referenced to generate a new second metadata. The metadata specification may include information indicating the name of the object data header and the name of the metadata as information designating the first metadata to be referenced. For example, the metadata specification can include the designation of "object: ball (pitch) and metadata: object position". In this case, the metadata providing unit 233 can search for the metadata with the designated name provided to the object with the designated name for each of the plurality of target digital content. According to this method, second metadata corresponding to each of the plurality of digital content can be generated.

Also, as illustrated in FIG. 8, the metadata specification can include information indicating the type of metadata to be generated by the second metadata generation unit 232. The metadata specification illustrated in FIG. 8 designates generating a pitch type, pitch speed, and sharpness parameter and the criteria for determining each parameter.

Processing Method

FIG. 9 is a flowchart illustrating the processing process for the generation unit 220 to generate digital content. In step S901, the video generation unit 222 obtains the camera path designated by the scene information. As described above, the scene designation unit 221 generates such scene information.

In step S902, the video generation unit 222 obtains the 3D model from the model storing unit 214. The video generation unit 222 can obtain the 3D models necessary to generate a virtual viewpoint video. For example, the video generation unit 222 can obtain the 3D model of the object shown in the virtual viewpoint video and the 3D model of the background on the basis of the camera path obtained in step S901. Note that the 3D model of the object is also transmitted to the first metadata generation unit to be used in step S904. In step S903, the video generation unit 222 generates a virtual viewpoint video on the basis of the obtained 3D models and camera path.

In step S904, the first metadata generation unit 223 generates metadata on the position of the object as described above on the basis of the 3D model of the object obtained in step S902. In step S905, the first metadata generation unit 223 executes processing to recognize the object as described above on the basis of the 3D model of the object obtained in step S902. In the present embodiment, when the object is recognized as a person, the processing proceeds to step S906. Otherwise, the processing proceeds to step S907. In step S906, the first metadata generation unit 223 generates metadata on the pose of the object as described above on the basis of the 3D model of the object obtained in step S902.

In step S907, the content generation unit 224 generates digital content on the basis of the virtual viewpoint video generated in step S903, the scene information generated by the scene designation unit 221, and the metadata generated in steps S904 and S906. In step S908, the content storing unit 231 stores the digital content generated in step S907.

Figure 10:
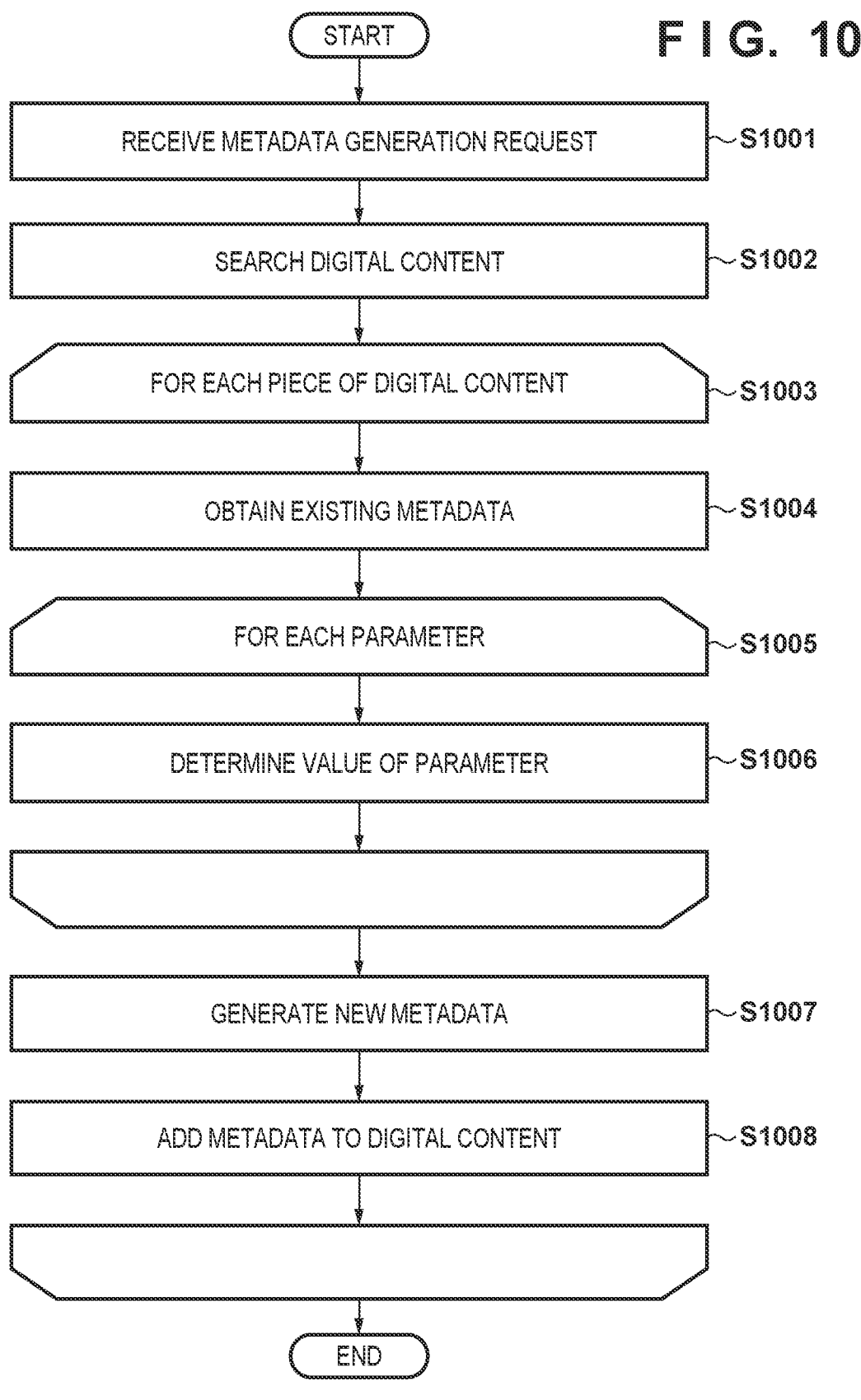
FIG. 10 is a flowchart for metadata generation processing according to an embodiment.

FIG. 10 is a flowchart indicating the processing process for the providing unit 230 to generate metadata. In the example described below, the providing unit 230 adds new metadata (second metadata) to the digital content in response to a metadata generation request.

In step S1001, the second metadata generation unit 232 receives a metadata generation request from the generation request unit 312 of the app 300. In step S1002, the second metadata generation unit 232 searches for the digital content which is the target of the processing to add metadata on the basis of the metadata specification included in the metadata generation request. As described above, in the metadata specification, the digital content for processing is designated.

The processing of steps S1003 to S1008 is executed for each of the digital content retrieved in step S1002. In step S1004, the second metadata generation unit 232 obtains the existing metadata (first metadata) to be used to generate the second metadata on the basis of the metadata specification. The metadata to be obtained is specified in the metadata specification as described above.

The processing of steps S1005 to S1006 is executed for each parameter to be generated. The parameter to be generated is designated in the metadata specification as described above. In step S1006, the second metadata generation unit 232 determines the value of the parameter using the existing metadata obtained in step S1004. In this manner, each parameter designated in the metadata specification is generated.

In step S1007, the second metadata generation unit 232 generates new metadata on the basis of the parameter generated in steps S1005 and S1006. In step S1008, the second metadata generation unit 232 adds the metadata generated in step S1007 to the digital content for processing. In this manner, the new metadata is added to each piece of digital content.

FIG. 11 is a flowchart illustrating the processing process for the terminal app 320 to use the metadata included in the digital content stored by the providing unit 230.

In step S1101, the terminal app 320 obtains a list of the usable digital content from the metadata providing unit 233. As described above, the terminal app 320 may obtain a list of the digital content usable by the user. The digital content usable by the user is digital content possessed by the user, for example. The terminal app 320 can obtain a list of the usable digital content using an identifier of the user using the terminal app 320.

In step S1102, the user selects the desired digital content. For example, the terminal app 320 may display a list of the digital content obtained in step S1101. In this case, as illustrated in FIG. 13A, the user can select a desired digital content 1301 from among the displayed digital content.

In step S1103, the user selects the desired object. The user can select a specific object relating to the digital content selected in step S1102. Here, the metadata providing unit 233 may transmit the virtual viewpoint video included in the digital content selected in step S1101 to the terminal app 320. In this case, the terminal app 320 can display the virtual viewpoint video as illustrated in FIG. 13B, for example. The virtual viewpoint video can include a plurality of objects. At this time, the user can select an object on such a virtual viewpoint video generated on the basis of the 3D model of the object. For example, the user can select an object by touching the object in the virtual viewpoint video.

In step S1104, the terminal app 320 generates a metadata obtaining request on the basis of the selection in step S1103. The metadata obtaining request includes information indicating the digital content selected in step S1102. Also, the metadata obtaining request can include information designating the metadata to obtain. Here, the information designating the metadata can include information specifying an object selected from a plurality of objects. In this example, the metadata obtaining request includes information indicating the object selected in step S1103. In this example, the information specifying the object includes position information indicating the position corresponding to the object on the virtual viewpoint video. For example, the information indicating the object can include information such as the time of the virtual viewpoint video displayed when a touch input was performed in step S1103 and the touch position in the virtual viewpoint video. Also, the information designating the metadata can include information indicating the creator of the obtained metadata. In this example, the creator of the obtained metadata is the same as the transmitter of the metadata obtaining request. Also, the terminal app 320 transmits such a metadata obtaining request to the metadata providing unit 233.

In step S1105, the metadata providing unit 233 determines the object indicated by the metadata obtaining request. The metadata providing unit 233 can identify the object indicated by the position information included in the metadata obtaining request on the basis of information on the 3D model of the object and information indicating the virtual viewpoint. The processing process for determining the object will be described below in detail with reference to FIG. 12.

In step S1106, the metadata providing unit 233 obtains the metadata for the object determined in step S1105. In this example, the metadata providing unit 233 obtains metadata which a child node of an object header for the object determined in step S1105 has. Here, the metadata providing unit 233 obtains the metadata which records the provider of the terminal app 320 as the creator. In other words, the metadata transmitted by the metadata providing unit 233 in this example is associated with information indicating the creator of the metadata which the metadata obtaining request includes. Note that the metadata obtained in step S1106 is metadata newly added in step S1008.

In step S1107, the metadata providing unit 233 transmits the metadata obtained in step S1106 to the terminal app 320. In this manner, the metadata providing unit 233 can provide the metadata on the 3D model of the object generated in accordance with the metadata generation request in step S1007. The metadata transmitted by the metadata providing unit 233 is metadata on the 3D model of the object specified by the metadata obtaining request.

In step S1108, the metadata receiving unit 322 receives the transmitted metadata. In step S1109, the parameter application unit 323 operates in accordance with the meta-data received in step S1108. For example, as illustrated in FIG. 13C, the parameter application unit 323 can control the display operation by the terminal app 320 to make a character 1303 throw a ball in accordance with the parameter included in the metadata. Note that the image of the ball to be thrown in FIG. 13C can be generated on the basis of a 3D model different from the 3D model of the ball included in the digital content 1301 selected as in FIG. 13A. In this manner, in the present embodiment, the display (for example, the position, pose, or movement of an object) of an object different from the 3D model included in the digital content can be controlled in accordance with metadata on the 3D model included in the digital content.

Note that as described above, the method for transmitting metadata corresponding to a selected object on the basis of the selection of the object on the virtual viewpoint video can be applied when transmitting various types of metadata. The transmitted metadata is not limited to metadata generated by the second metadata generation unit 232 in accordance with a metadata generation request. According to such a method, the user of the app 300 can obtain the desired metadata via an intuitive method.

FIG. 12 is a flowchart illustrating the processing process for determining the object indicated by the metadata obtaining request in step S1105.

In step S1201, the metadata providing unit 233 obtains the metadata obtaining request described above. In step S1202, the metadata providing unit 233 obtains information indicating the position and orientation of the virtual viewpoint at the time indicated in the metadata obtaining request from the camera path included in the digital content selected in step S1102. In step S1203, the metadata providing unit 233 calculates a camera matrix for the virtual viewpoint from the information indicating the position and orientation of the virtual viewpoint. The camera matrix indicates a parameter for converting the position on the virtual viewpoint video into a three-dimensional position in the virtual space (or imaging region). In step S1204, the metadata providing unit 233 uses the camera matrix calculated in step S1203 to convert the touch position on the virtual viewpoint video into a three-dimensional position in the virtual space. With this processing, a straight line extending from the position of the virtual viewpoint corresponding to the touch position on the virtual viewpoint video is derived.

In step S1205, the metadata providing unit 233 sequentially selects the objects included in the digital content selected in step S1102. When an object is selected, the processing proceeds to step S1206. In a case where no object could be selected, that is, all of the objects have already been selected, the processing proceeds to step S1209.

In step S1206, the metadata providing unit 233 determines the position of the object at the time indicated in the metadata obtaining request on the basis of the metadata indicating the position of the object selected in step S1205. In step S1207, the metadata providing unit 233 determines whether or not the position determined in step S1206 is on the straight line specified by the processing of step S1204. In a case where the distance between the position of the object and the straight line is within a threshold, the meta-data providing unit 233 may determine that the position of the object is on the straight line. In a case where the position of the object is on the straight line, the processing proceeds to step S1208. Otherwise, the processing returns to step S1205.

In step S1208, the metadata providing unit 233 determines that the object obtained in step S1205 is the object indicated by the metadata obtaining request. In step S1209, the metadata providing unit 233 determines that the object indicated by the metadata obtaining request could not be found.

As described above, the user may be allocated the right to use specific digital content. Such right to use digital content may be managed using a blockchain technique. For example, the digital content may be provided with a non-fungible token (NFT). The NFT is one token issued and distributed on the blockchain. The NFT standard is defined by ERC-721 or ERC-1155, for example. By obtaining an NFT, the user can obtain the right for the digital content provided with the NFT. Such a token can be stored in association with a wallet managed by the user.

To enhance the asset value of the digital content, the quantity of the digital content to be provided may be limited. In other words, only a limited number of users may be able to use the digital content. The digital content may also be managed using a serial number. The digital content can be given rarity via this method.

Also, the digital content may be allocated information indicating the rarity to indicate the value of the digital content. The rarity, for example, can be set by the provider of the digital content according to the scene situation or the quantity of the digital content for distribution. The user can easily understand the value of the digital content on the basis of the rarity. Also, the amount to be paid by the user to obtain the right to use the digital content may be set according to the rarity.

Here, the rarity of the digital content can be set according to the number of pieces of metadata included in the digital content. For example, the second metadata generation unit 232 can set the rarity of the digital content according to the number of pieces of metadata generated by the second metadata generation unit 232. The second metadata generation unit 232 may change the rarity to be higher when second metadata is added to the digital content.

In the embodiment described above, the metadata generated by the second metadata generation unit 232 is added to the digital content stored in the content storing unit 231 of the providing unit 230. According to this configuration, in a case where the provider of the digital content and the provider of the app 300 cooperate for an extended period of time, metadata that can be used in the app 300 progressively increases. Also, in conjunction with the increase in metadata, the rarity of the digital content can progressively increase. Thus, such a configuration leads to an increase in user satisfaction.

On the other hand, the metadata generated by the second metadata generation unit 232 may be provided to the terminal app 320 without being added to the digital content. FIG. 14 illustrates an example of the functional configuration of the information processing apparatus 100 and the app 300 according to such an embodiment. The difference with FIG. 3 is that the generation request unit 312 is included in the terminal app 320 instead of the management server 310. In this example, the metadata providing unit 233 transmits the metadata to the transmission source of the metadata generation request. For example, the metadata providing unit 233 can transmit the metadata generated in response to the metadata generation request to the metadata receiving unit 322 of the terminal app 320. Here, the second metadata generation unit 232 does not add the generated metadata to the digital content.

According to this configuration, the metadata of the digital content stored in the content storing unit 231 does not change. According to this configuration, in a case where the provider of the digital content and the provider of the app 300 temporarily cooperate, user confusion due to the addition and deletion of metadata can be prevented. Also, temporary increase and decrease of the rarity of digital content due to the addition or deletion of metadata can be prevented.

According to the embodiment described above, metadata that can be used by the app 300 external to the information processing apparatus 100 can be generated on the basis of information (for example, information indicating the position or pose) on the 3D model of the object. Since the type of the metadata can be designated by the app 300, appealing content can be easily provided in cooperation with another application.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™) a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-061548, filed Apr. 5, 2023, which is hereby incorporated by reference herein in its entirety.

What is claimed is:

1. An information processing apparatus comprising one or more memories storing instructions, and one or more processors that execute the instructions to:

obtaining information on a 3D model of an object;

generate metadata on the 3D model of the object on a basis of the information in accordance with a metadata generation request including a metadata type designation; and transmit the metadata on the 3D model of the object generated in accordance with the generation request.

2. The information processing apparatus according to claim 1, wherein the metadata on the 3D model of the object indicates movement of the object.

3. The information processing apparatus according to claim 1, wherein the metadata on the 3D model of the object indicates speed of movement of the object, a classification result of movement of the object, or a classification result of pose of the object.

4. The information processing apparatus according to claim 1, wherein the generation request includes information designating a generation method for the metadata.

5. The information processing apparatus according to claim 1, wherein the metadata includes a parameter selected from a plurality of values, and the generation request includes information indicating a number of the plurality of values.

6. The information processing apparatus according to claim 1, wherein the metadata includes a parameter selected from a plurality of values, wherein the one or more processors execute the instructions to determine the parameter by comparing a value based on the information on the 3D model with a threshold, and wherein the generation request includes information indicating the threshold.

7. The information processing apparatus according to claim 1, wherein the metadata includes a parameter selected from a plurality of values, wherein the one or more processors execute the instructions to determine the parameter on a basis of a comparison between data based on the information on the 3D model and reference data corresponding to the value, and wherein the generation request includes information indicating the reference data.

8. The information processing apparatus according to claim 1, wherein the generation request includes information designating the information on the 3D model of the object used for generating the metadata.

9. The information processing apparatus according to claim 1, wherein the information on the 3D model of the object is metadata indicating a position, pose, and/or shape of the object.

10. The information processing apparatus according to claim 1, wherein the information on the 3D model of the object is generated on a basis of the 3D model of the object before the generation request is obtained.

11. The information processing apparatus according to claim 1, wherein the one or more processors execute the instructions to store the metadata on the 3D model of the object generated in accordance with the generation request.

12. The information processing apparatus according to claim 1, wherein the one or more processors execute the instructions to obtain a metadata obtaining request separate from the generation request and transmit the metadata in accordance with the obtaining request.

13. The information processing apparatus according to claim 12, wherein the one or more processors execute the instructions to store the metadata in association with information indicating a creator of the generation request, wherein the obtaining request includes information indicating a creator of metadata to be obtained, and wherein the metadata to be transmitted is associated with the information indicating the creator of the metadata included in the obtaining request.

14. The information processing apparatus according to claim 12, wherein the obtaining request includes information specifying an object selected from a plurality of objects, wherein the one or more processors execute the instructions to transmit metadata on a 3D model of the object specified by the obtaining request, and wherein selection of the object is performed on a virtual viewpoint video generated on a basis of the 3D model of the object.

15. The information processing apparatus according to claim 1, wherein the one or more processors execute the instructions to transmit the metadata to a transmission source of the generation request.

16. The information processing apparatus according to claim 1, wherein the one or more processors execute the instructions to store digital content relating to a scene, and wherein the digital content includes a virtual viewpoint video corresponding to the scene generated on a basis of the 3D model of the object, the metadata generated, and scene information indicating information relating to the scene.

17. The information processing apparatus according to claim 16, wherein the one or more processors execute the instructions to set a rarity of the digital content in accordance with a number of the metadata generated included in the digital content.

18. The information processing apparatus according to claim 1, wherein the one or more processors execute the instructions to generate the 3D model of the object on a basis of images of an object captured by a plurality of image capture apparatuses.

19. An information processing method comprising:

utilizing a processor that performs the following steps:

obtaining information on a 3D model of an object;

generating metadata on the 3D model of the object on a basis of the information in accordance with a metadata generation request including a metadata type designation; and transmitting the metadata on the 3D model of the object generated in accordance with the generation request.

20. A non-transitory computer-readable medium storing a program executable by a computer to perform a method comprising:

obtaining information on a 3D model of an object;

generating metadata on the 3D model of the object on a basis of the information in accordance with a metadata generation request including a metadata type designation; and transmitting the metadata on the 3D model of the object generated in accordance with the generation request.

* * * * *